US011897219B2

(12) United States Patent
He et al.

(10) Patent No.: US 11,897,219 B2
(45) Date of Patent: Feb. 13, 2024

(54) IMPACT FORMING DEVICE AND METHOD FOR LOCAL SMALL FEATURES ON METAL THIN-WALLED CURVED-SURFACE PART

(71) Applicant: Dalian University of Technology, Dalian (CN)

(72) Inventors: Zhubin He, Dalian (CN); Haihui Zhu, Dalian (CN)

(73) Assignee: Dalian University of Technology, Dalian (CN)

( * ) Notice: Subject to any disclaimer, the term of this patent is extended or adjusted under 35 U.S.C. 154(b) by 51 days.

(21) Appl. No.: 17/685,712

(22) Filed: Mar. 3, 2022

(65) Prior Publication Data

US 2022/0305751 A1 Sep. 29, 2022

(30) Foreign Application Priority Data

Mar. 24, 2021 (CN) ........................ 202110313372.X

(51) Int. Cl.

| | |
|---|---|
| ***B21D 26/00*** | (2006.01) |
| ***B30B 1/00*** | (2006.01) |
| ***B21D 22/02*** | (2006.01) |
| ***B21D 37/12*** | (2006.01) |

(52) U.S. Cl.

CPC .............. *B30B 1/001* (2013.01); *B21D 22/02* (2013.01); *B21D 37/12* (2013.01)

(58) Field of Classification Search

CPC ...... B21D 26/021; B21D 26/06; B21D 26/12; B21D 26/14; B21D 26/031; B21D 31/06; B30B 1/001

See application file for complete search history.

(56) References Cited

U.S. PATENT DOCUMENTS

2019/0168280 A1* 6/2019 Avrillaud ................ B30B 1/001

* cited by examiner

*Primary Examiner* — Debra M Sullivan

(74) *Attorney, Agent, or Firm* — Ulmer & Berne LLP

(57) ABSTRACT

An impact forming device and method for local small features on a metal thin-walled curved-surface part. The impact forming device includes impact forming dies, impact loading units and a forming supporting die, wherein the impact forming die is provided with an impact forming part, and the impact forming part is a convex part corresponding to a local small feature; the forming supporting die can support and fix a metal thin-walled curved-surface part without forming local small features, and the forming supporting die is provided with concave parts matched with the impact forming parts; and the impact loading unit includes a guide rail, an explosive ball and a detonating block, under the impact loading of the impact loading units, the impact forming parts can impact the metal thin-walled curved-surface part without forming local small features under the matching action of the concave parts to form the local small features.

20 Claims, 10 Drawing Sheets

IMPACT FORMING DEVICE AND METHOD FOR LOCAL SMALL FEATURES ON METAL THIN-WALLED CURVED-SURFACE PART

CROSS REFERENCE TO RELATED APPLICATION(S)

This patent application claims the benefit and priority of Chinese Patent Application No. 202110313372.X, filed on Mar. 24, 2021, the disclosure of which is incorporated by reference herein in its entirety as part of the present application.

TECHNICAL FIELD

The present disclosure relates to the technical field of metal thin-walled part forming, and particularly relates to an impact forming device and method for local small features on a metal thin-walled curved-surface part.

BACKGROUND ART

Metal thin-walled curved-surface parts are widely applied to aviation, aerospace, automobiles and electronic products, such as aircraft skins, automobile outer covering parts and internal integral B columns, intelligent electronic product metal shells and the like. In order to form a reasonable pneumatic flow field, meet a precise connection relation, obtain artistic modeling and other different purposes, the metal thin-walled curved-surface part often has the characteristics of local protrusions, recesses, ridges and the like.

In general, the structural features of the metal thin-walled curved-surface part can be divided into overall macroscopic shape and local special structure. Because the macroscopic shape and the local special structure of the part have obvious differences in the aspects of curvature change speed, fillet radius size and the like, the deformation flow of the material is completely different when the shapes and the features are formed, and different forming methods are needed to be adopted for respective forming. For the thin-walled curved-surface part with a large overall size, due to the fact that the blank is small in rigidity, when macroscopic shape and local features are formed, the blank generally needs to be restrained through a die, then loading forming is conducted through a rigid male die, a fluid medium or electromagnetic force, and corresponding forming methods are called stamping forming, fluid bulging and electromagnetic forming.

During stamping forming, a male die and a female die need to be matched to achieve loading of a plate blank. After the plate blank is formed into a large-range macroscopic shape through the integral die, small features such as concave, convex or ridge lines are formed independently and locally through the small die. However, processing production, independent control and matching of an integral forming die and a local small die are difficult. When the fluid is bulged, the blank is pressed against the female die through the fluid medium such as high-pressure liquid or gas. The required media pressure is relatively small when the macroscopic shape is formed, but the medium pressure of 50 MPa or even higher is often required when local small features are formed. Because the medium pressure generally acts on the whole blank at the same time, a press machine with a large tonnage is often needed to counteract counterforce generated by a high-pressure medium, and high requirements are provided for die clamping force, control precision and the like of equipment. Moreover, no matter press forming or fluid bulging, quasi-static loads are applied to the plate blank, and the forming speed of the blank is relatively slow, so that significant overall springback is prone to occur, and significant deformations can also occur in the area adjacent to the area where the loads are concentrated, so that the accuracy of the final component is affected. In addition, when the local small features are formed, because deformation is mainly concentrated in a smaller area and the deformation amount is large, the material is more prone to thinning and cracking, and therefore higher requirements are made for the forming performance of the material.

According to electromagnetic forming, the plate blank is rapidly loaded through electromagnetic force, the material deforms at a very high strain rate, and no complex friction force exists between the die and the blank, so that the forming performance of the material is improved. However, when the local small features are formed, electromagnetic forming requires special large-size equipment and dies, and interference is often formed between the special large-size equipment and dies and the integral forming die, so that the implementation difficulty is large. Liquid impact forming in recent years drives a liquid medium by using a high-speed hammer and the like, and then a rapid high-pressure effect is generated on the surface of the metal plate blank. However, the forming method also needs special equipment to establish a high-pressure environment on the die and the plate blank for a short time, the implementation difficulty is large, and the forming method cannot be used for local small feature forming of large-size thin-walled curved-surface parts at present.

Generally speaking, when the local small features on the metal thin-walled curved-surface part are formed, existing methods such as stamping forming, fluid bulging, electromagnetic forming or liquid impact forming need special equipment and complex die tools, so that the cost is high, and the efficiency is low. When the local small features are large in difference from the shape, the curvature radius, the fillet radius and the like of an adjacent area, reasonable arrangement and coordination work of the integral forming die and a local small feature forming die are difficult or even cannot be achieved in a limited narrow space. Therefore, there is a need for a forming technique capable of flexibly generating a large enough acting force and a high enough loading speed in a local area of the metal thin-walled curved-surface part to be formed, so that the plate blank is rapidly and intensively deformed.

SUMMARY

The present disclosure aims to provide an impact forming device and method for local small features on a metal thin-walled curved-surface part so as to solve the problems in the prior art, and the impact forming device for local small features is convenient to produce and operate, low in production cost, high in production efficiency and good in forming effect and can be formed and used in extreme environments.

In order to achieve the purpose, the present disclosure provides the following scheme:

The impact forming device for local small features on a metal thin-walled curved-surface part provided by the present disclosure comprises impact forming dies, impact loading units and a forming supporting die, wherein

- the impact forming die is provided with an impact forming part, and the impact forming part is a convex part corresponding to a local small feature;

the forming supporting die can support and fix a metal thin-walled curved-surface part without forming local small features, and the forming supporting die is provided with concave parts matched with the impact forming parts; and the impact loading unit comprises a guide rail, an explosive ball and a detonating block, the detonating block and the explosive ball are both arranged in the guide rail, the explosive ball can be triggered through the detonating block to apply an instantaneous impact load to the impact forming die, and under the impact loading of the impact loading units, the impact forming parts can impact the metal thin-walled curved-surface part without forming local small features under the matching action of the concave parts to form the local small features.

Preferably, the guide rail is arranged to be a linear cylinder, and the detonating block is arranged to be a firing pin.

Preferably, the guide rail is a curve cylinder, and the detonating block is arranged to be a steel ball.

Preferably, fixed blocks are arranged on the forming supporting die and are used for fixing the metal thin-walled curved-surface part without forming local small features on the forming supporting die.

The present disclosure also provides an impact forming method for local small features on a metal thin-walled curved-surface part based on an impact forming device for local small features on a metal thin-walled curved-surface part, comprising the following steps:

S1, analyzing the overall shape and local small features of the metal thin-walled curved-surface part, and designing and machining a forming supporting die and impact forming dies;

S2, supporting and fixing the metal thin-walled curved-surface part without forming local small features by using the forming supporting die; and S3, applying an instantaneous impact load to the impact forming die by using an impact loading unit, and impacting the metal thin-walled curved-surface part without forming local small features under the matching action of the concave parts by the impact forming parts to complete the impact forming of the local small features.

Preferably, when the local small features are concave features, the inner wall of the metal thin-walled curved-surface part without forming local small features is supported through the forming supporting die, and the impact loading units perform impact loading inwards from the outer side of the metal thin-walled curved-surface part without forming local small features through the impact forming dies.

Preferably, when the local small features are convex features, the outer wall of the metal thin-walled curved-surface part without forming local small features is supported through the forming supporting die, and the impact loading units perform impact loading outwards from the inner side of the metal thin-walled curved-surface part without forming local small features through the impact forming dies.

Preferably, when the local small features are a plurality of same local small features, a group of impact forming dies and a group of impact loading units are formed in sequence one by one.

Preferably, when the local small features are a plurality of different local small features, multiple groups of impact forming dies and multiple groups of impact loading units perform simultaneous loading at the same time.

Compared with the prior art, the present disclosure has the following technical effects:

Firstly, according to the impact forming device and method for local small features on a metal thin-walled curved-surface part provided by the present disclosure, the impact loading units are adopted for rapidly forming a plurality of local small features, the impact loading units provide impact loads by adopting energy generated by instantaneous explosion of the explosive balls, the impact loading units are small in size, convenient to operate and free of extra special equipment, and the forming device can be conveniently matched with the forming supporting die, so that forming of local small features in various forms is completed.

Secondly, according to the impact forming device and method for local small features on a metal thin-walled curved-surface part provided by the present disclosure, the impact loading units are adopted for rapidly forming a plurality of local small features, and because the relatively independent explosive balls are adopted as the sources of the impact loads, the explosive balls are easy to prepare, the ammunition amount is easy to adjust, and expensive special equipment is not needed, the cost is very low.

Thirdly, according to the impact forming device and method for local small features on a metal thin-walled curved-surface part provided by the present disclosure, the impact loading units are adopted for rapidly forming a plurality of local small features, and because the impact loads drive the impact forming dies with a very small size through energy generated by instantaneous explosion of the explosive balls, a very concentrated area on the blank can be loaded, the problem that other adjacent areas are unnecessarily deformed due to the fact that loads are not concentrated in a traditional loading mode is avoided, and the forming effect is good.

Fourthly, according to the impact forming device and method for local small features on a metal thin-walled curved-surface part provided by the present disclosure, the impact loading units are adopted for rapidly forming a plurality of local small features, and because the impact loads are transmitted by the impact forming dies with a very small size, the device and method can be used for forming various metal thin plates even non-metal materials, and the limitation that an electromagnetic forming technology can only be used for magnetic metal materials is avoided.

Fifthly, according to the impact forming device and method for local small features on a metal thin-walled curved-surface part provided by the present disclosure, the impact loading units are adopted for rapidly forming a plurality of local small features, and because the impact loads are instantly applied by the impact loading units which are small in size and easy to operate, the device does not need to be tightly connected with a die tool and is in long-time contact with the die tool, so that the impact forming device and method for local small features can be used in special conditions of high temperature, low temperature, high pressure and the like, and solves the problem that equipment and tools adopted in an existing method cannot be used in extreme environments.

BRIEF DESCRIPTION OF THE DRAWINGS

To more clearly illustrate the embodiment of the present disclosure or the technical scheme in the prior art, the following briefly introduces the attached figures to be used in the embodiment. Apparently, the attached figures in the following description show merely some embodiments of the present disclosure, and those skilled in the art may still derive other drawings from these attached figures without creative efforts.

REFERENCE SIGNS

100, impact forming device for local small features on metal thin-walled curved-surface part; 1, impact forming die; 2, impact loading unit; 3, forming supporting die; 4, impact forming part; 5, concave part; 6, guide rail; 7, explosive ball; 8, detonating block; 9, fixed block; 10, metal thin-walled curved-surface part without forming local small features; 11, supporting female die; 12, impact wave; and 13, supporting male die.

DETAILED DESCRIPTION OF THE EMBODIMENTS

The following clearly and completely describes the technical scheme in the embodiments of the present disclosure with reference to the attached figures in the embodiments of the present disclosure. Apparently, the described embodiments are merely a part rather than all of the embodiments of the present disclosure. Based on the embodiment in the present disclosure, all other embodiments obtained by the ordinary technical staff in the art under the premise of without contributing creative labor belong to the scope protected by the present disclosure.

The present disclosure aims to provide an impact forming device and method for local small features on a metal thin-walled curved-surface part so as to solve the problems in the prior art, and the impact forming device for local small features is convenient to produce and operate, low in production cost, high in production efficiency and good in forming effect and can be formed and used in extreme environments.

To make the foregoing objective, features and advantages of the present disclosure clearer and more comprehensible, the present disclosure is further described in detail below with reference to the attached figures and specific embodiments.

Embodiment I

Figure 1:
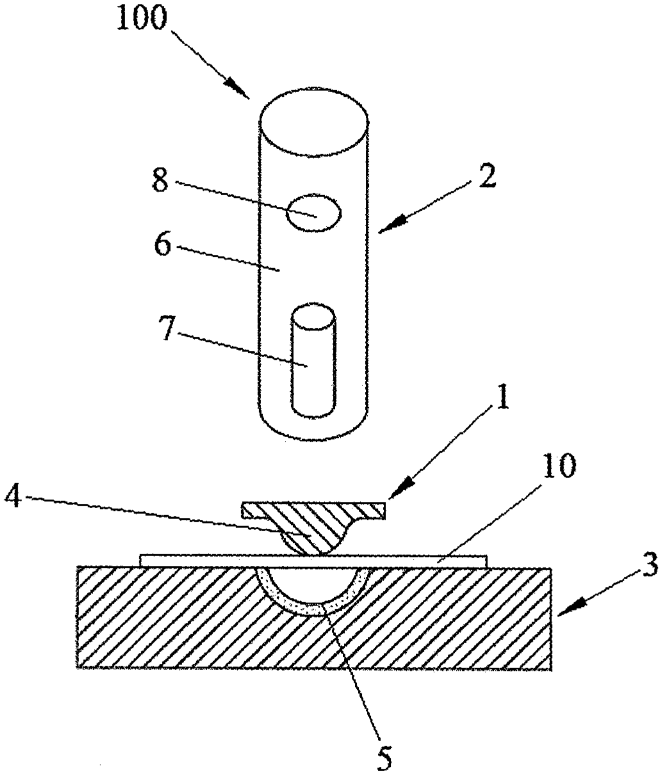
FIG. 1 is a forming schematic diagram of an impact forming device for local small features on a metal thin-walled curved-surface part in the first embodiment.
Figure 2:
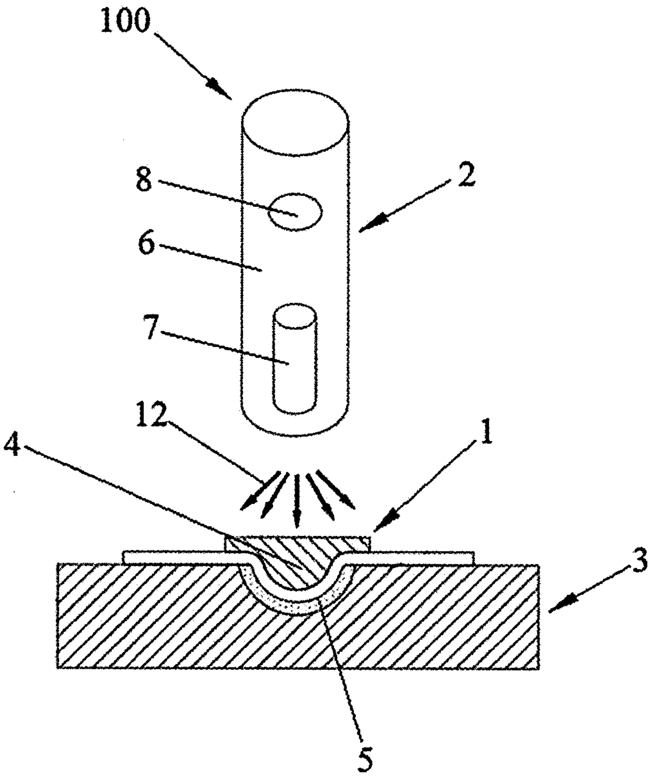
FIG. 2 is an impact forming state diagram of an impact forming device for local small features on a metal thin-walled curved-surface part in the first embodiment.

As shown in FIG. 1 and FIG. 2, the impact forming device 100 for local small features on a metal thin-walled curved-surface part provided by the embodiment comprises impact forming dies 1, impact loading units 2 and a forming supporting die 3, wherein

- the impact forming die 1 is provided with an impact forming part 4, and the impact forming part 4 is a convex part corresponding to a local small feature;
- the forming supporting die 3 can support and fix a metal thin-walled curved-surface part 10 without forming local small features, and the forming supporting die 3 is provided with concave parts 5 matched with the impact forming parts 4; and
- the impact loading unit 2 comprises a guide rail 6, an explosive ball 7 and a detonating block 8, the detonating block 8 and the explosive ball 7 are both arranged in the guide rail 6, the explosive ball 7 can be triggered through the detonating block 8 to apply an instantaneous impact load to the impact forming die 1, and under the impact loading of the impact loading units 2, the impact forming parts 4 can impact the metal thin-walled curved-surface part 10 without forming local small features under the matching action of the concave parts 5 to form the local small features.

During impact forming of the local small features of the metal thin-walled curved-surface part, the metal thin-walled curved-surface part 10 without forming local small features is supported and fixed by using the forming supporting die 3, and the forming supporting die 3 can be of a structure in an integral forming die when the metal thin-walled curved-surface part is integrally formed (the local small features are not formed), for example, a male die or a female die in the integral forming die can be adopted for supporting and fixing the metal thin-walled curved-surface part, correspondingly, the concave parts 5 matched with the impact forming parts 4 are arranged in the male die or the female die in the integral forming die, then the impact forming dies 1 are assembled to the positions corresponding to the concave parts, the explosive ball 7 is triggered through the detonating block 8, shock waves 12 generated by the explosive ball 7 instantly act on the impact forming dies 1, the impact forming parts 4 rapidly impact the metal thin-walled curved-surface part 10 without forming local small features under the matching action of the concave parts 5, so that the local small features are formed, and the impact forming state of the local small features is as shown in FIG. 2. The impact loading units 2 provide impact loads by adopting energy generated by instantaneous explosion of the explosive balls 7, the impact loading units 2 are small in size, convenient to operate and free of extra special equipment, and the forming device can be conveniently matched with the forming supporting die 3, so that forming of local small features in various forms is completed; because the relatively independent explosive balls 7 are adopted as the sources of the impact loads, the explosive balls are easy to prepare, the ammunition amount is easy to adjust, and expensive special equipment is not needed, the cost is very low; because the impact loads drive the impact forming dies 1 with a very small size through energy generated by instantaneous explosion of the explosive balls 7, a very concentrated area on the blank can be loaded, the problem that other adjacent areas are unnecessarily deformed due to the fact that loads are not concentrated in a traditional loading mode is avoided, and the forming effect is good; and because the impact loads are instantly applied by the impact loading units 2 which are small in size and easy to operate, the device does not need to be tightly connected with a die tool and is in long-time contact with the die tool, so that the impact forming device and method for local small features can be used in special conditions of high temperature, low temperature, high pressure and the like, and solves the problem that equipment and tools adopted in an existing method cannot be used in extreme environments.

In the embodiment, the guide rail 6 is arranged to be a linear cylinder, and the detonating block 8 is arranged to be a firing pin. The firing pin can provide initial acceleration by a high-pressure shoot nail device (such as a nail gun). The firing pin moves in the linear cylinder to fire the explosive ball 7, the firing direction of the explosive ball 7 is consistent with the acting direction of the explosive ball 7 applying the impact load, and impact forming operation with local small features is facilitated.

When the forming supporting die 3 is under the condition of high temperature, ultralow temperature or high pressure, the impact forming die 1 can be embedded into the forming supporting die 3 in advance, the impact loading units 2 make contact with the impact forming dies 1 in a short time and completes firing, tight connection and long-time contact with the die tool are not needed, and therefore the forming supporting die 3 can be used in the special conditions of high temperature, low temperature, high pressure and the like, and the problem that equipment and tools adopted in the existing method cannot be used in extreme environments is solved.

Embodiment II

Figure 3:
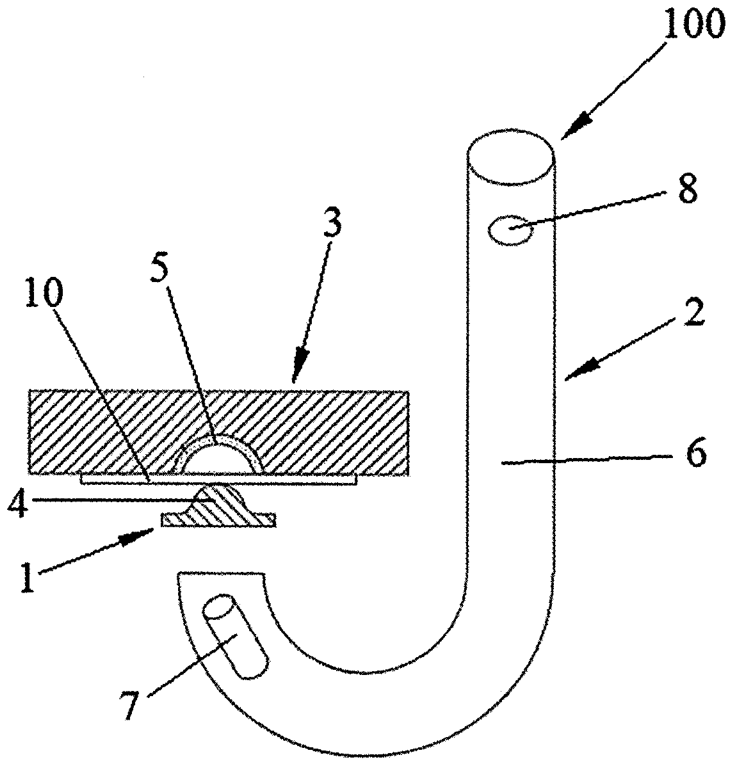
FIG. 3 is a forming schematic diagram of an impact forming device for local small features on a metal thin-walled curved-surface part in the second embodiment.
Figure 4:
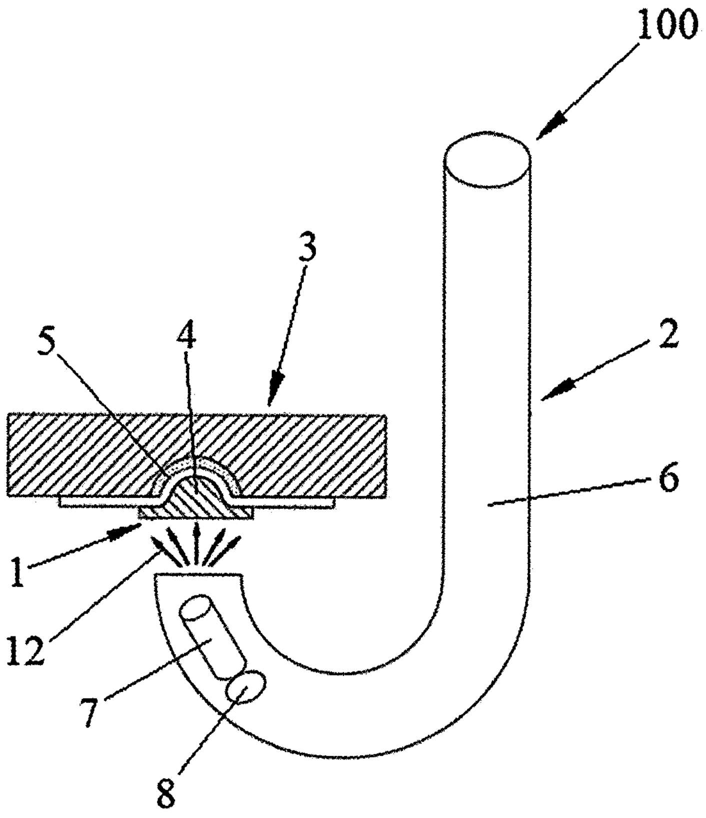
FIG. 4 is an impact forming state diagram of an impact forming device for local small features on a metal thin-walled curved-surface part in the second embodiment.

As shown in FIG. 3 and FIG. 4, the embodiment provides an impact forming device 100 for local small features on a metal thin-walled curved-surface part, and the difference from the first embodiment lies in that the guide rail 6 is arranged to be a linear cylinder, and the detonating block 8 is arranged to be a firing pin. The firing pin can provide initial acceleration by a high-pressure shoot nail device (such as a nail gun). The guide rail 6 is arranged to be a curve cylinder, the steel ball moves in the curve cylinder to fire the explosive ball 7, the fired direction of the explosive ball 7 is inconsistent with the acting direction of the explosive ball 7 applying impact load, and therefore impact loading can be conducted on narrow spaces, the back faces of die tools and shielded parts.

Embodiment III

Figure 5:
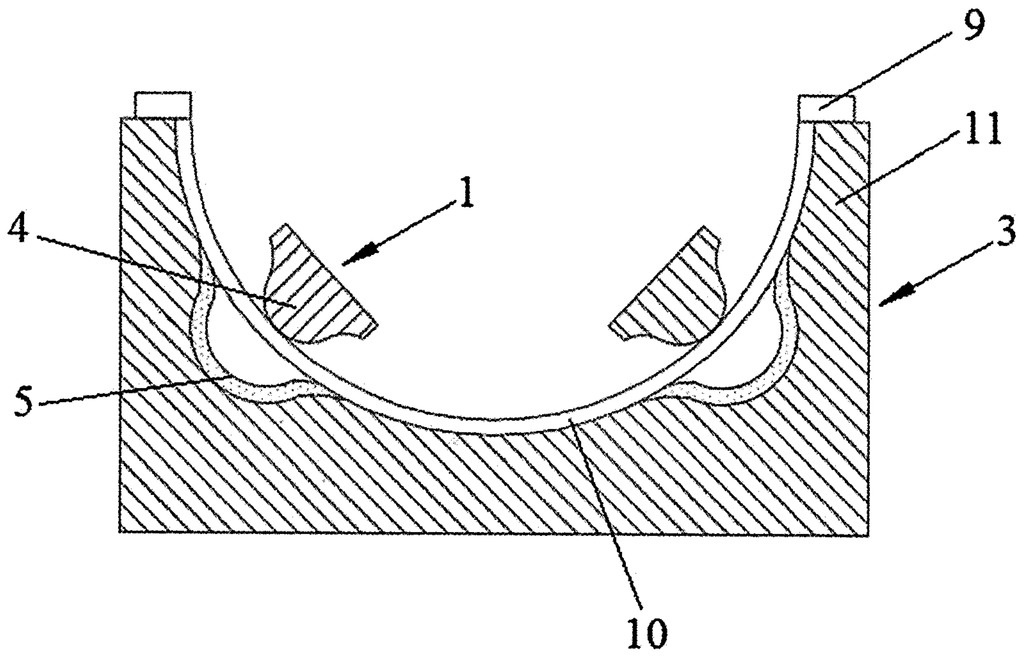
FIG. 5 is a forming schematic diagram of an impact forming device for local small features on a metal thin-walled curved-surface part in the third embodiment.
Figure 6:
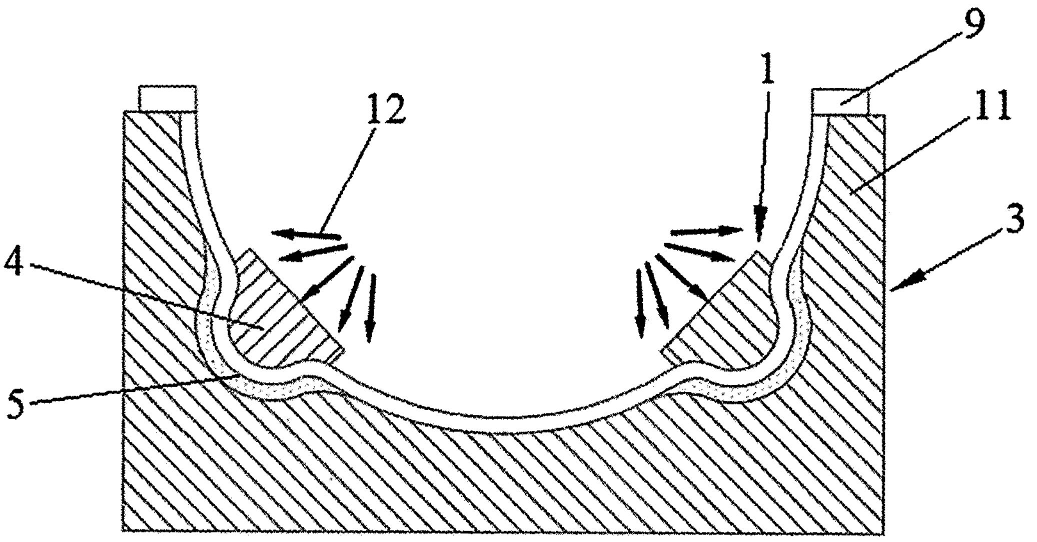
FIG. 6 is an impact forming state diagram of an impact forming device for local small features on a metal thin-walled curved-surface part in the third embodiment.

As shown in FIG. 5 and FIG. 6, the embodiment provides an impact forming device 100 for local small features on a metal thin-walled curved-surface part, and the difference from the first embodiment lies in that fixed blocks 9 are arranged on the forming supporting die 3 and are used for fixing the metal thin-walled curved-surface part 10 without forming local small features on the forming supporting die 3. In the embodiment, the forming supporting die 3 specifically can be a supporting female die 11, the supporting female die 11 is provided with concave parts 5 matched with the impact forming parts 4, the metal thin-walled curved-surface part 10 without forming local small features is supported and fixed in the supporting female die 11 through the supporting female die 11 and the fixed blocks 9, and the impact forming dies 1 are assembled at the positions corresponding to the concave parts 5, so that the impact loading units 2 apply the impact loads to the impact forming dies 1 so as to form the local small features.

Embodiment IV

The embodiment provides an impact forming method for local small features on a metal thin-walled curved-surface part, comprising the following steps:

S1, analyzing the overall shape and local small features of the metal thin-walled curved-surface part, and designing and machining a forming supporting die 3 and impact forming dies 1;

S2, supporting and fixing the metal thin-walled curved-surface part 10 without forming local small features by using the forming supporting die 3; and S3, applying an instantaneous impact load to the impact forming die 1 by using an impact loading unit 2, and impacting the metal thin-walled curved-surface part without forming local small features under the matching action of the concave parts 5 by the impact forming parts 4 to complete the impact forming of the local small features.

Figure 7:
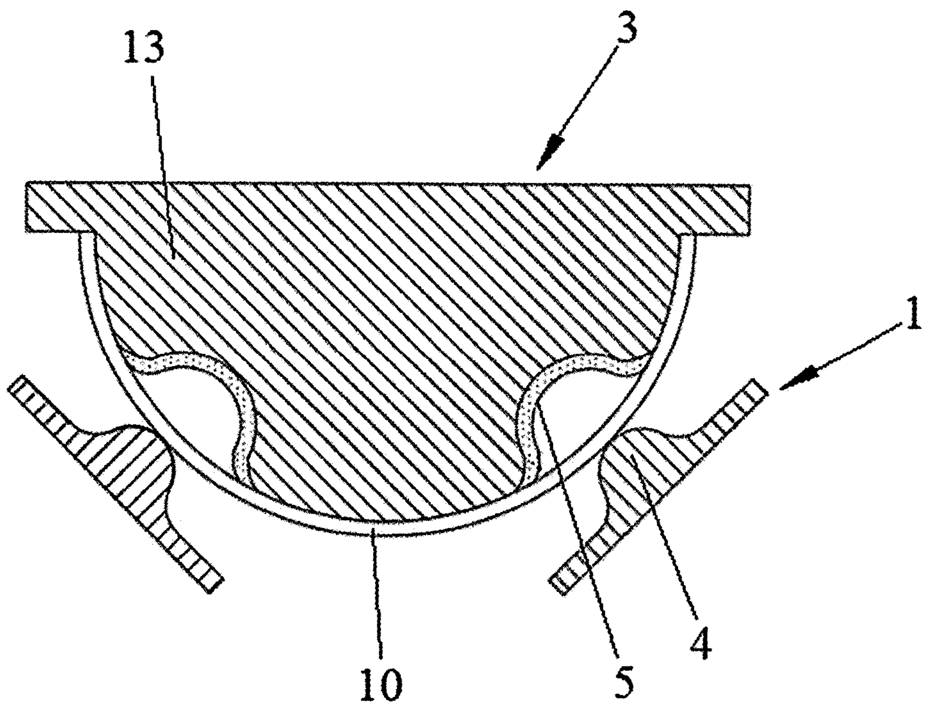
FIG. 7 is a forming schematic diagram of an impact forming device for local small features on a metal thin-walled curved-surface part when local small features are concave features in the fourth embodiment.
Figure 8:
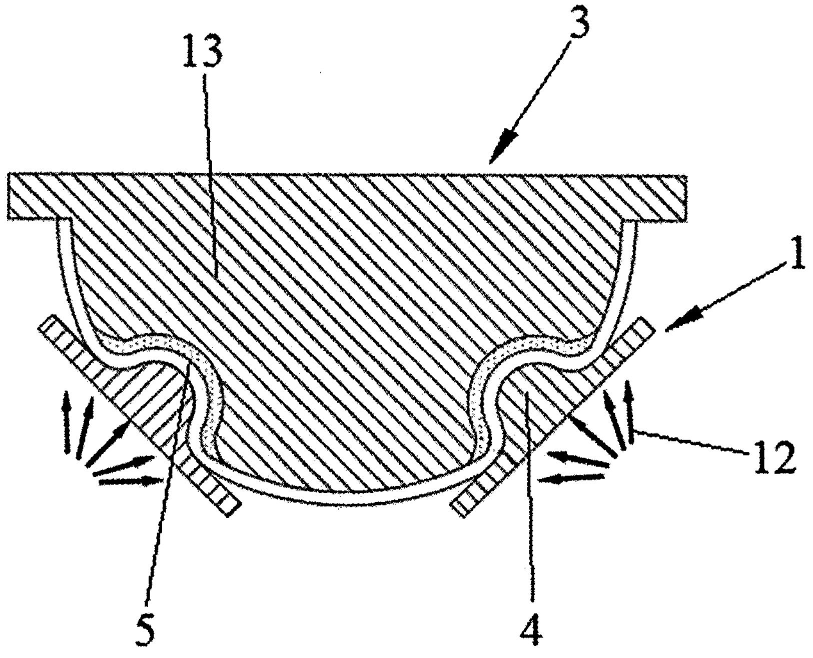
FIG. 8 is an impact forming state diagram of an impact forming device for local small features on a metal thin-walled curved-surface part when local small features are concave features in the fourth embodiment.

As shown in FIG. 7 and FIG. 8, when the local small features are concave features, the inner wall of the metal thin-walled curved-surface part 10 without forming local small features is supported through the forming supporting die 3, and the impact loading units 2 perform impact loading inwards from the outer side of the metal thin-walled curved-surface part 10 without forming local small features through the impact forming dies 1. The forming support die 3 specifically can be a supporting male die 13, the supporting male die 13 is provided with concave parts 5, the angles and directions of the impact loading units 2 can be predetermined to work in cooperation with the forming supporting die 3 according to the concave position required to be formed.

As shown in FIG. 5 and FIG. 6, when the local small features are convex features, the outer wall of the metal thin-walled curved-surface part 10 without forming local small features is supported through the forming supporting die 3, and the impact loading units 2 perform impact loading outwards from the inner side of the metal thin-walled curved-surface part 10 without forming local small features through the impact forming dies 1. The angles and directions of the impact loading units 2 can be predetermined to work in cooperation with the forming supporting die 3 according to the convex position required to be formed.

Figure 9:
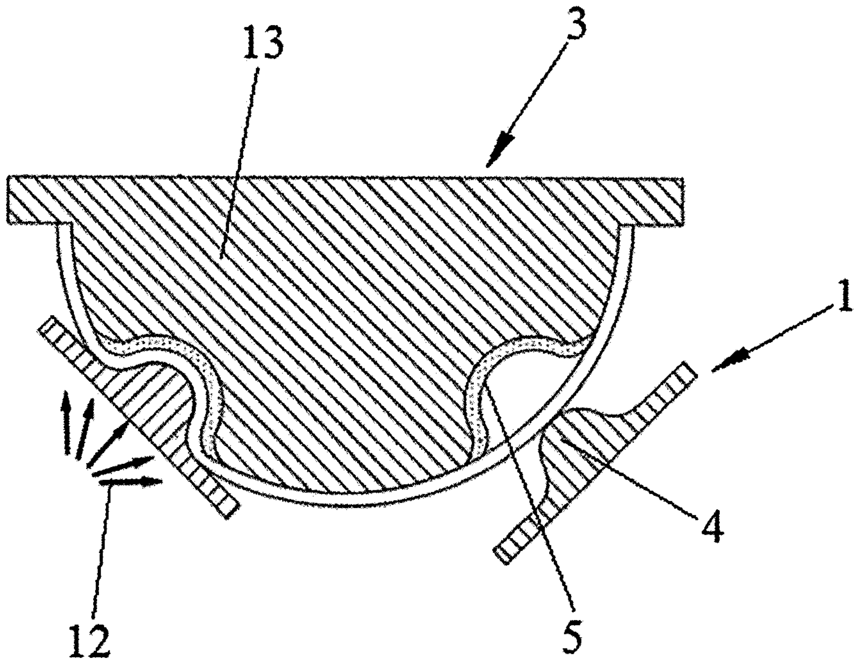
FIG. 9 is a schematic diagram that a group of impact forming dies and a group of impact loading units are formed in sequence one by one in the fourth embodiment.

As shown in FIG. 9, when the local small features are a plurality of same local small features, a group of impact forming dies 1 and a group of impact loading units 2 are formed in sequence one by one. The impact loading unit 2 has the characteristics of universality, portability and operation convenience and is free of extra special equipment, and the forming device can be conveniently matched with the forming supporting die 3, so that forming of local small features in various forms is completed, and the production cost is greatly reduced.

Figure 10:
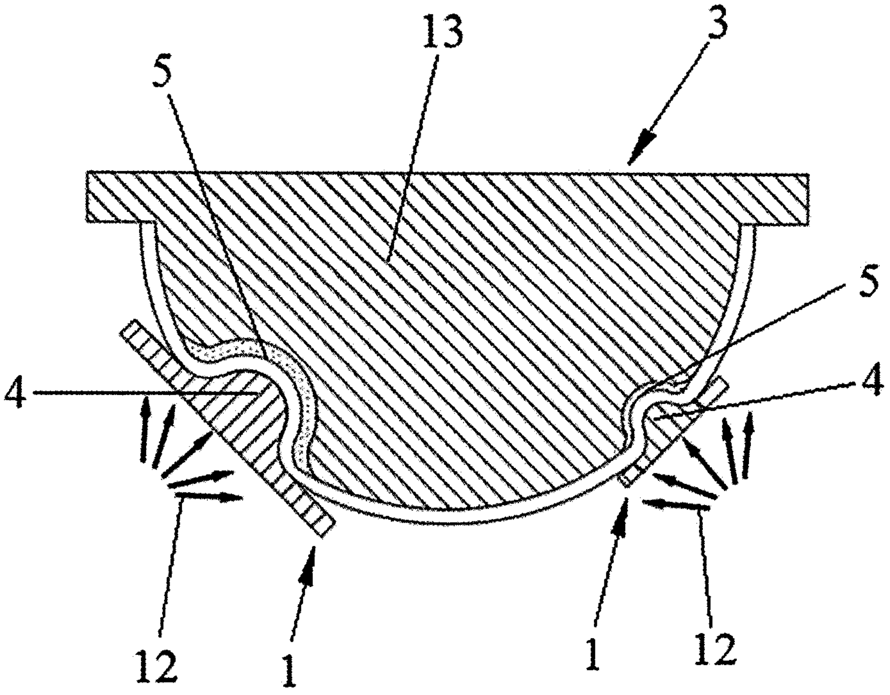
FIG. 10 is a schematic diagram that multiple groups of impact forming dies and multiple groups of impact loading units perform simultaneous loading at the same time in the fourth embodiment.

As shown in FIG. 10, when the local small features are a plurality of different local small features, multiple groups of impact forming dies 1 and multiple groups of impact loading units 2 perform simultaneous loading at the same time. The multiple groups of impact loading units 2 can fire the explosive balls 7 at almost the same moment, and the generated impact loads almost simultaneously act on the metal thin-walled curved-surface part 10 without forming local small features, so that deformation interference of adjacent areas possibly generated during sequential loading is avoided.

Specific examples are used for illustration of the principles and implementation methods of the present disclosure. The description of the above-mentioned embodiments is used to help illustrate the method and its core principles of the present disclosure. In addition, those skilled in the art can make various modifications in terms of specific embodiments and scope of application in accordance with the teachings of the present disclosure. In conclusion, the content of this specification shall not be construed as a limitation to the present disclosure.

What is claimed is:

1. An impact forming device for forming local small features on a metal thin-walled curved-surface part, comprising impact forming dies, impact loading units and a forming supporting die, wherein each impact forming die is provided with an impact forming part, and the impact forming part is a convex part corresponding to a local small feature;

the forming supporting die can support and fix a metal thin-walled curved-surface part without local small features, and the forming supporting die is provided with concave parts matched with impact forming parts; and each impact loading unit comprises a guide rail, an explosive ball and a detonating block, the detonating block and the explosive ball are both arranged in the guide rail, the explosive ball can be triggered through the detonating block to apply an instantaneous impact load to the impact forming die, and under an impact loading of the impact loading units, the impact forming parts can impact the metal thin-walled curved-surface part to form the local small features.

2. The impact forming device for forming local small features on a metal thin-walled curved-surface part according to claim 1, wherein the guide rail is arranged to be a linear cylinder, and the detonating block is arranged to be a firing pin.

3. The impact forming device for forming local small features on a metal thin-walled curved-surface part according to claim 1, wherein the guide rail is a curve cylinder, and the detonating block is arranged to be a steel ball.

4. The impact forming device for forming local small features on a metal thin-walled curved-surface part according to claim 1, wherein fixed blocks are arranged on the forming supporting die and are used for fixing the metal thin-walled curved-surface part without forming local small features on the forming supporting die.

5. An impact forming method for local small features on a metal thin-walled curved-surface part based on an impact forming device for forming local small features on a metal thin-walled curved-surface part according to claim 1, comprising the following steps:

S1, analyzing an overall shape of the metal thin-walled curved-surface part and local small features intended to be formed, and designing and machining the forming supporting die and the impact forming dies;

S2, supporting and fixing the metal thin-walled curved-surface part without forming local small features by using the forming supporting die; and S3, applying the instantaneous impact load to the impact forming die by using the impact loading unit, and impacting the metal thin-walled curved-surface part by the impact forming parts to complete the impact forming of the local small features.

6. The impact forming method for local small features on a metal thin-walled curved-surface part according to claim 5, wherein the guide rail is arranged to be a linear cylinder, and the detonating block is arranged to be a firing pin.

7. The impact forming method for local small features on a metal thin-walled curved-surface part according to claim 6, wherein when the local small features are concave features, an inner wall of the metal thin-walled curved-surface part without forming local small features is supported through the forming supporting die, and the impact loading units perform impact loading inwards from an outer side of the metal thin-walled curved-surface part without forming local small features through the impact forming dies.

8. The impact forming method for local small features on a metal thin-walled curved-surface part according to claim 6, wherein when the local small features are convex features, an outer wall of the metal thin-walled curved-surface part without forming local small features is supported through the forming supporting die, and the impact loading units perform impact loading outwards from an inner side of the metal thin-walled curved-surface part without forming local small features through the impact forming dies.

9. The impact forming method for local small features on a metal thin-walled curved-surface part according to claim 6, wherein when the local small features are a plurality of same local small features, the plurality of same local small features are formed in sequence one by one by means of a group of impact forming die and impact loading units.

10. The impact forming method for local small features on a metal thin-walled curved-surface part according to claim 5, wherein the guide rail is a curve cylinder, and the detonating block is arranged to be a steel ball.

11. The impact forming method for local small features on a metal thin-walled curved-surface part according to claim 10, wherein when the local small features are concave features, an inner wall of the metal thin-walled curved-surface part without forming local small features is supported through the forming supporting die, and the impact loading units perform impact loading inwards from an outer side of the metal thin-walled curved-surface part without forming local small features through the impact forming dies.

12. The impact forming method for local small features on a metal thin-walled curved-surface part according to claim 10, wherein when the local small features are convex features, an outer wall of the metal thin-walled curved-surface part without forming local small features is supported through the forming supporting die, and the impact loading units perform impact loading outwards from an inner side of the metal thin-walled curved-surface part without forming local small features through the impact forming dies.

13. The impact forming method for local small features on a metal thin-walled curved-surface part according to claim 10, wherein when the local small features are a plurality of same local small features, the plurality of same local small features are formed in sequence one by one by means of a group of impact forming die and impact loading unit.

14. The impact forming method for local small features on a metal thin-walled curved-surface part according to claim 5, wherein fixed blocks are arranged on the forming supporting die and are used for fixing the metal thin-walled curved-surface part without forming local small features on the forming supporting die.

15. The impact forming method for local small features on a metal thin-walled curved-surface part according to claim 14, wherein when the local small features are concave features, an inner wall of the metal thin-walled curved-surface part without forming local small features is supported through the forming supporting die, and the impact loading units perform impact loading inwards from an outer side of the metal thin-walled curved-surface part without forming local small features through the impact forming dies.

16. The impact forming method for local small features on a metal thin-walled curved-surface part according to claim 14, wherein when the local small features are convex features, an outer wall of the metal thin-walled curved-surface part without forming local small features is supported through the forming supporting die, and the impact loading units perform impact loading outwards from an inner side of the metal thin-walled curved-surface part without forming local small features through the impact forming dies.

17. The impact forming method for local small features on a metal thin-walled curved-surface part according to claim 5, wherein when the local small features are concave features, an inner wall of the metal thin-walled curved-surface part without forming local small features is supported through the forming supporting die, and the impact loading units perform impact loading inwards from an outer side of the metal thin-walled curved-surface part without forming local small features through the impact forming dies.

18. The impact forming method for local small features on a metal thin-walled curved-surface part according to claim 5, wherein when the local small features are convex features, an outer wall of the metal thin-walled curved-surface part without forming local small features is supported through the forming supporting die, and the impact loading units perform impact loading outwards from an inner side of the metal thin-walled curved-surface part without forming local small features through the impact forming dies.

19. The impact forming method for local small features on a metal thin-walled curved-surface part according to claim 5, wherein when the local small features are a plurality of same local small features, the plurality of same local small features are formed in sequence one by one by means of a group of impact forming die and impact loading units.

20. The impact forming method for local small features on a metal thin-walled curved-surface part according to claim 5, wherein, in step S3, when the local small features are a plurality of different local small features, the plurality of different local small features are formed at the same time by applying simultaneous impact loads to multiple groups of impact forming dies and impact loading units.

* * * * *